United States Patent [19]

Ishii et al.

[11] Patent Number: 5,515,304
[45] Date of Patent: May 7, 1996

[54] PORTABLE CALCULATOR FOR AN ARRAY CALCULATION

[76] Inventors: Masataka Ishii, 412-10, Karasawa, Fujisawa-shi, Kanagawa; Hideki Mizukami, 205, 30-17, Chitosedai 3-chome, Setagaya-ku, Tokyo, both of Japan

[21] Appl. No.: 330,586

[22] Filed: Oct. 28, 1994

[30] Foreign Application Priority Data

Jul. 19, 1994 [JP] Japan ..................... 6-188743

[51] Int. Cl.⁶ ........................................ G06F 3/00
[52] U.S. Cl. ........................................ 364/709.12
[58] Field of Search ................. 364/709.12, 709.14, 364/709.16, 710.1, 710.14

[56] References Cited

U.S. PATENT DOCUMENTS 4,695,983  9/1987  Oda et al. ............... 364/709.12
4,718,029  1/1988  Morino et al. .......... 364/709.16

OTHER PUBLICATIONS

APL/360–OS (5734–XM6) and APL/360–DOS (5736–XM6) General Information Manual Dec. 1970.

*Primary Examiner*—Tan V. Mai
*Attorney, Agent, or Firm*—Whitman, Curtis Whitman & McGinn

[57] ABSTRACT

A portable calculator for operating a calculation between arrays or between an array and a single operand has an array detecting section. The array detecting section identifies each of operands included in an arithmetic expression as a single operand or an element of an array including a plurality of elements, each successive two of elements in the array sandwiching a space and sandwiching no operator. The calculation is executed defined by the arithmetic expression between each of the elements of a single array and a single operand or between corresponding elements of a plurality of arrays.

6 Claims, 3 Drawing Sheets

PORTABLE CALCULATOR FOR AN ARRAY CALCULATION

BACKGROUND OF THE INVENTION (a) Field of the Invention

The present invention relates to a portable calculator and, more particularly, to a simple portable calculator used for business calculations such as a tabular calculation.

(b) Description of the Related Art

Most of portable calculators used in offices, schools, and homes are simple calculators which carry out basic four arithmetic operations (i.e., addition, subtraction, multiplication, and division), except for some calculators for technical calculation. In the operation of such a portable calculator, a numerical value for a first operand, an arithmetic operator and another numerical value for a second operand are successively input, for example, then an equal sign is finally input. Upon the input of the equal sign, the result of the arithmetic calculation will be immediately displayed on a display unit. Since such operations can be carried out by inputting operands and arithmetic operators in accordance with an arithmetic expression, it is not necessary to learn a complicated operational procedure for the calculator.

Table 1 shows an example of a calculation table requiring simple tabular calculations for completion of the table.

TABLE 1

|  | APR | MAY | JUN | JLY | AUG | SEP | TOTAL |
|---|---|---|---|---|---|---|---|
| Sales | 140 | 145 | 155 | 162 | 166 | 175 |  |
| Cost price | 100 | 105 | 110 | 125 | 110 | 145 |  |
| Gross profit |  |  |  |  |  |  |  |
| Gross profit rate |  |  |  |  |  |  |  |
| Personnel expenses | 10 | 11 | 12 | 11 | 12 | 13 |  |
| Overhead expenses | 11 | 12 | 13 | 12 | 11 | 12 |  |
| Net profit |  |  |  |  |  |  |  |
| Net profit rate |  |  |  |  |  |  |  |

Table 1 includes many spaces to be filled. To fill the spaces for the total column for the sum of values from April through September, the Following key input operations will be required:

For the sales; "140+145+ . . . +175=";

For the cost price; "100+105+ . . . +145=";

For the personal expenses; "10+11+ . . . +13=";

and

For the overhead expenses; "11+12+ . . . +12=".

Thus, obtained totals are individually read from the display, and posted to the spaces for the total column. To complete the total column in these operations, the number of required key input operations is 48, including 24 times for operands, 20 times for arithmetic operators, and 4 times for equal signs, wherein the number of key input operations for an operand is counted as one.

Subsequently, to calculate monthly gross profits, the following key operations are performed:

"140–100="; "145–105="; . . . ; and "175–145=".

Thus, obtained results are also read from the display and posted, respectively. For these calculations, the total number of key input operations, counted in the same manner as for the total column, is 28. Similarly, in the calculations for obtaining gross profit rates (%), a gross profit (A) in each month is divided by a corresponding sale (B), and results obtained by the division are multiplied by 100. For these calculations, key operations are performed in accordance with an arithmetic expression "A÷B×100". In these operations, the number of key input operations becomes 42. Further, additional 42 key input operations are required for each of the calculation For net profit and for net profit rate. Accordingly, the total number of key input operations becomes 202.

Since conventional calculators require a large number off key input operations, quick and skillful key operations are required for a quick calculation. Moreover, since keys For numerals are generally arranged in a group, and keys for arithmetic operators such as "+" and "–" are arranged in another group apart from the numeral key group, alternate operations of the keys for operands and arithmetic operators are somewhat difficult for unskilled operators.

Accordingly, if the total number of key input operations required during tabular calculations can be reduced, it is convenient for both skilled operators and unskilled operators. Especially, if the number of key input operations for arithmetic operators can be reduced, it becomes more convenient for the unskilled operators. However, no conventional portable calculators have a function to satisfy the needs as described above.

SUMMARY OF THE INVENTION

In view of the foregoing, it is an object of the present invention to provide an improved calculator which can reduce the number of key input operations required for calculations such as a tabular calculation, thereby increasing the speed of tabular calculation.

Another object of the present invention is to provide an improved calculator especially convenient for unskilled operators.

Still another object of the present invention is to provide an improved calculator which does not require special and complicated knowledge or skill.

A calculator according to the present invention comprises: an input key group for inputting an arithmetic expression, the input key group including a plurality of first keys each For inputting a decimal digit constituting an operand as combined or alone, at least one second key for inputting an operator and at least one third key for inputting a separating symbol; a first memory section, operatively connected to the input key group, for storing an arithmetic expression input by the input key group; an array detecting section, operatively connected to the first memory section, for identifying each operand included in the arithmetic expression as a single operand or one of a plurality of element of an array, each successive two of the plurality of elements in each array sandwiching a separating symbol and sandwiching no operator; a second memory section, operatively connected to the array detecting section, for storing each array identified by the array detecting section; an arithmetic executing section, operatively connected to the first memory section and second memory section, for executing an arithmetic operation between corresponding elements of a plurality of arrays or between each of the plurality of elements of the array and the single element in accordance with the arithmetic expression.

The input key group may additionally include keys for inputting some alphabets, special other symbols. Any key except for numerical keys and operator symbol keys may be used as the separating symbol key for inputting the separating symbol. A preferred key for inputting the separating symbol is a space key for inputting spaces which are displayed in a visually desirable fashion. A bar-shaped key or a key bar may be used as the space key so as to facilitate input operation for spaces. The separating symbol may be called a "combining symbol", since it combines a plurality of operands as an array.

It is preferred that the at least one second key include keys for inputting basic arithmetic operators for inputting basic four arithmetic calculations, i.e., addition, subtraction, multiplication and division, as well as parentheses and equal sign. Other arithmetic operator symbol keys or functional operator symbol keys may be provided for inputting operators such as powers, trigonometric functions including sine and cosine, and a logarithmic function.

It is also preferred to provide an error detection section which generates an alarm when an error exists in an arithmetic expression. For example, when a plurality of arrays are found in a single arithmetic expression and the numbers of elements included in the respective arrays are not equal to each other, it is determined that an error exists.

The portable calculator according to the present invention should preferably comprise a display section for visually exhibiting characters or symbols which have been input. It is preferred that the portable calculator according to the present invention has a plurality of memory sections each for storing one of arrays included in an arithmetic expression. These memory sections are preferably used also for storing variables for an operand or an array manually input in accordance with specific operations.

In the calculator according to the present invention, when a plurality of operands or numerical values are input together with a separating symbol, the number of key input operations required for inputting an arithmetic expression can be reduced significantly without losing the resemblance between the arithmetic expression and key input operations therefor. Accordingly, the speed of key inputs for an arithmetic calculation can be significantly increased.

BRIEF DESCRIPTION OF THE DRAWINGS

The above and other objects, features and advantages of the present invention will be more apparent from the following description, taken in conjunction with accompanying drawings in which.

DESCRIPTION OF THE PREFERRED EMBODIMENT

Figure 1:
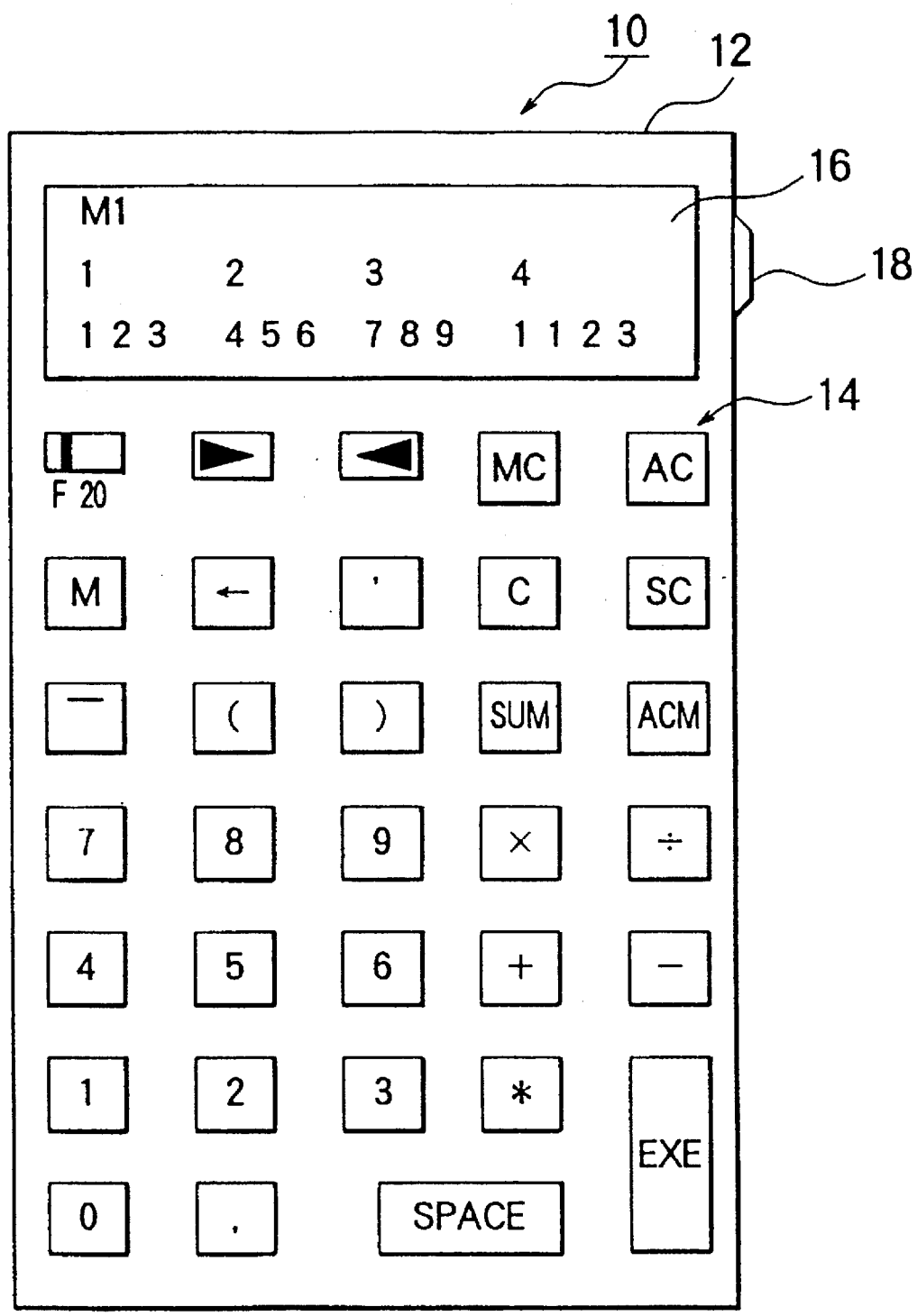
FIG. 1 is a plan view showing the appearance of a portable calculator according to an embodiment of the present invention.

A preferred embodiment of the present invention will now be described with reference to the accompanying drawings. FIG. 1 shows a portable calculator according to an embodiment of the present invention. The portable calculator 10 of FIG. 1 has a body 12, and a key input section 14, a display section 16 and a power switch 18 disposed on the front and side surfaces of the body 12.

Each of the keys in the key input section 14 has one of the following functions. An execution key ("EXE." key) at the bottom-right corner is provided For inputting an execution command to the calculator 10, while a "SPACE" key bar adjacent to the "EXE" key is provided for inputting spaces each used as a separating symbol for dividing operands to form an array. A key arranged at the left end in the uppermost row and indicated as "F20" is provided for changing the number of digits below a decimal point to be displayed. A pair of keys arranged on the right side of the "F20" key and each marked by a thick arrow are provided for moving a cursor to the right and the left, and for scrolling display to the right and the left.

An alphabet key "M" is provided for inputting a name of a variable by which the variable is to be stored. The alphabet key "M" may be used alone or in combination with numerical keys for defining names of variables such as M, M1, and M2. A key marked by "←" is provided for storing data in a memory area as a variable. For example, when a numerical value "10" is to be stored as a variable M, a series of key input operations "M ←10↓" ("↓" represents an operation of the EXE. key) is performed.

A group of clear keys located at the top-right corner are provided for clearing off data in a memory section. The clear keys marked by "MC", "AC", "C", and "SC" are used for memory clear, all clear, key input clear and screen clear, respectively. The MC key for memory clear is used in a series of key input operations such as "M1_M2_MC" ("_" represents an operation of the SPACE key). In this case, memory areas storing variables M1 and M2 are cleared off. The AC key is used for clearing all data and variables in the memory areas by a single operation thereof. The "C" key is pressed for cancelling data input before the pressing. However, cancellation of data cannot be carried out after the EXE. key has been pressed. For example, to cancel a numerical value "3", the cursor on the display is moved to a position at the numerical value "3", then the "C" key is pressed for clearing. The SC key for screen clear is used for clearing off the visual indications on the display. In this case, data input and stored in the memory section are retained.

Visual indications on the display section as shown in FIG. 1 is an example showing the contents of an array stored in the memory section and displayed in response to a series of key input operations "M1↓". Here, "M1" shown in the first row indicates that the displayed data are the contents of the variable M1. The indications in the second row, i.e., "1_2_ ..." show the orders of elements in the array M1, and the indications in the third row, i.e., "123_456 ... " show numerical values of elements in the array M1.

Below the clear keys, a group of arithmetic operator keys are arranged. A "SUM" key and a "ACM" key are provided for obtaining a total sum and an accumulated values of an array, respectively. For example, in response to a series of key input operations "SUM 1_2_3_4 ↓", an addition is performed to sum all the elements of an array input following the input of "SUM", and "10" will be displayed as an answer. When a series off key input operations "ACM 1_2_3_4↓" is performed, the succeeding elements of the input array are consecutively accumulated, then a series of answers "1_3_6_10" constituting an output array are displayed, in which each specific element of the output array represents a cumulative sum from the first element of the input array up to the element of the input array corresponding to the specific element of the output array.

Arithmetic operator symbol keys marked by symbols "+", "−", "X", "−" and "*" are provided for addition, subtraction, multiplication, division, and power, respectively. A key marked by "−" is provided for adding a minus sign to an operand, while a key marked by "," is provided for representing a connection between elements when a new array is to be formed. A pair of keys marked by "(" and by ")" are provided for inserting parentheses in an arithmetic expression. The input key group also includes numerical keys for inputting decimal digits and a key for inputting decimal points in addition, the input key group may includes other keys such as special or general function keys if desired.

Figure 2:
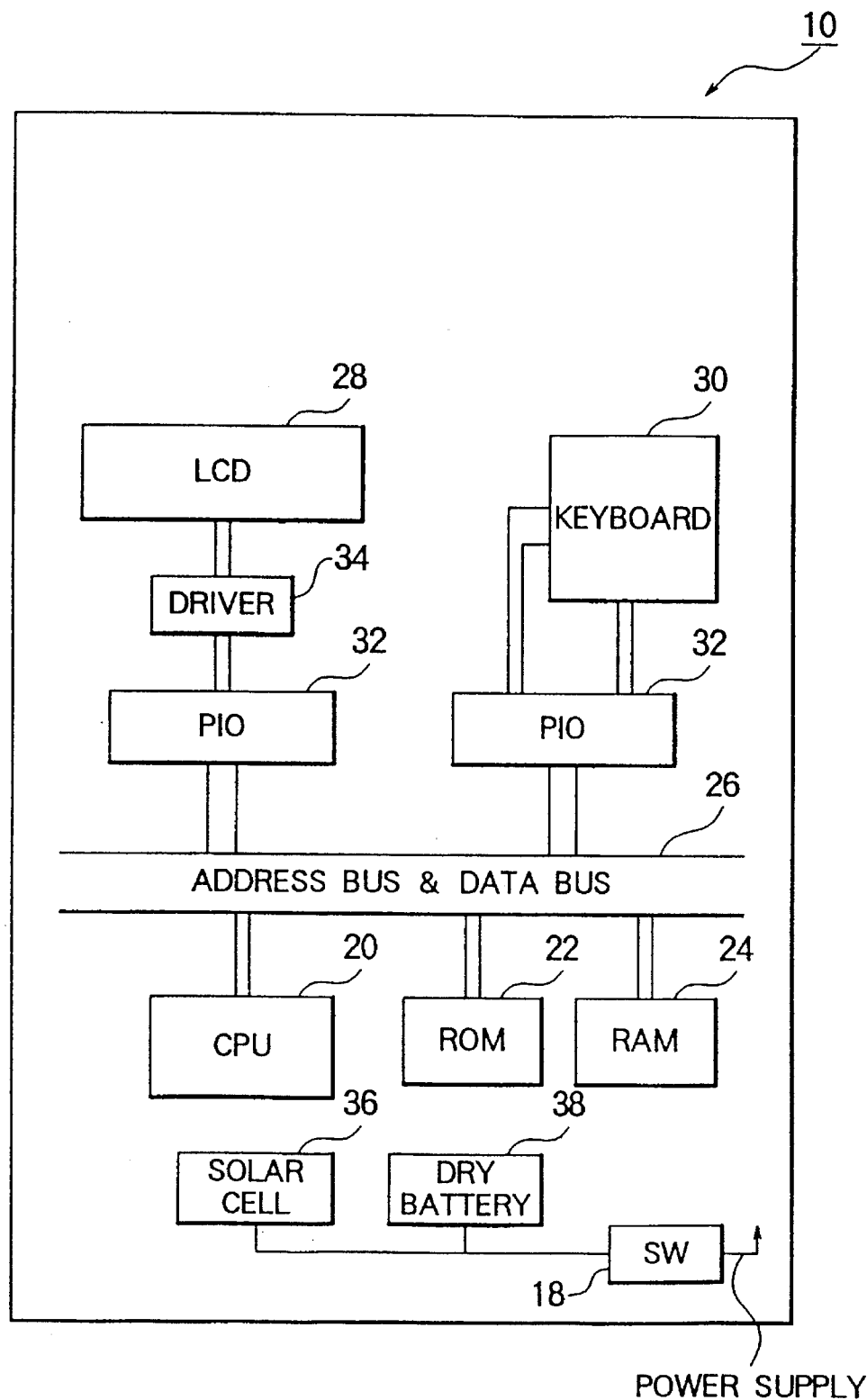
FIG. 2 is a block diagram showing hardware components of the portable calculator shown in FIG. 1.

FIG. 2 is a schematic block diagram showing hardware components of the portable calculator of FIG. 1. The portable calculator according to the present embodiment comprises a CPU 20, a ROM 22, a RAM 24, an address and data bus 26, an LCD 28 acting as a display section, and a keyboard 30. The LCD 28 is connected to the bus 26 via a PIO 32 and a driver 34, while the keyboard 30 is connected to the bus 26 via another PIO 32. Electric power can be supplied form both of a solar cell 36 and a dry battery 38.

The portable calculator according to the present embodiment is different from conventional ones in the following two points. First, the keyboard of the calculator includes the separating symbol key for inputting a separating symbol, i.e. a space key. Secondly, ROM 22 of the calculator stores a program which identifies an array or arrays and which command to operate calculations between each element of an array and a single operand or between corresponding elements in a plurality of arrays thus identified. The calculator according to the present embodiment is neither large nor complicated as compared to conventional ones. Moreover, the portable calculator does not cost much.

In the present embodiment, each of operands input for calculation, displayed on the LCD and stored in the memory section is restricted to a 12-digit number. However, the number of digits may be arbitrarily determined such that desired arithmetic calculations can be carried out. Further, taking various kinds of tabular calculations into consideration, the maximum number of elements to be included in each array is set at 15, and the maximum number of memory areas each for storing a variable or an array is set at 20.

Basic operation for key inputs in the calculator of the present embodiment will be described below.

To store data in a memory area as a variable, a series of key input operations "M1←2↓" is performed, for example. After the operation, "2" is stored in a first memory area as a variable M1. When another series of key input operations "M2←1_2_3 ↓" is subsequently performed, an array "1_2_3" is stored in a second memory area as a variable M2. Further, in response to a subsequent input of "M3←M1↓", the contents of the variable M1 is copied to a third memory area as a variable M3. When a series of key input operations is performed for inputting "M4←M2, 10_20 ↓", an array "M2, 10_20" is stored in a fourth memory area as a variable M4. As a result, the variable M4 now represents an array "1_2_3_10_20". When an input operation for "M1↓" is performed, the numerical value "2" will be displayed at the third row of the LCD. Similarly, when an input operation for "M2↓" is performed, the array "1_2_3", which is the contents of M2, will be displayed at the third row of the LCD.

For carrying out an ordinary calculation, an input operation, for example, "1+2↓" is performed. A numerical value "3" will be then displayed as an answer. Similarly, if arithmetic expressions "2×(3+4)↓" and "M1×2↓"(in the case described before) are input, answers "14" and will be displayed, respectively.

A calculation for an arithmetic expression including an array is carried out as follows. For example, when an input operation for an arithmetic expression "1_2_3×2↓" is performed, an output array "2_4_6" will be displayed. When an array "1_2_3" has been stored as a variable M2, and an arithmetic expression "M2*2↓" or "M2+5_6_7↓" is subsequently input, output array "1_4_9" or "6_8_10" will be displayed as an answer. Further, input operations for arithmetic expressions "SUM 1_2_3↓" and "4_9*0.5↓" will produce answers "6" and "2_3", respectively. Similarly, an input operation or "ACM M2↓" will produce an output array "1_3_6" for the variable M2 representing an array "1_2_3".

Correction of an arithmetic expression or numerical values can be carried out at any time until the "EXE." key is pressed. For example, if, after inputting "M← 11_33_44", a numerical value "22" is to be inserted between "11" and "33", the cursor is moved to a position at the first character of the numerical value "33", then "22" and a space are input. By this operation, the arithmetic expression is changed to "M←11_22_33_44". If it is desired to delete "33" in addition, the cursor is again moved to the position at the First character of "33", then the clear key "C" is pressed twice. Hence, a modified arithmetic expression "M←11_22_44" will be obtained.

In the event that an error is detected by the portable calculator after the EXE. key is pressed, a word "ERROR" will be displayed on the LCD regardless of the cause of the error. Such an error will be produced by an improper key operation. For example, when the numbers of elements in a plurality of arrays are not identical to each other, an error alarm will be generated. When an error is detected in the portable calculator, an operator of the calculator is requested to input a correct arithmetic expression from the beginning. However, another program For an error correcting procedure may be provided in the calculator to blink at an error portion and to receive an input from the operator for correction at the error portion.

Figure 3:
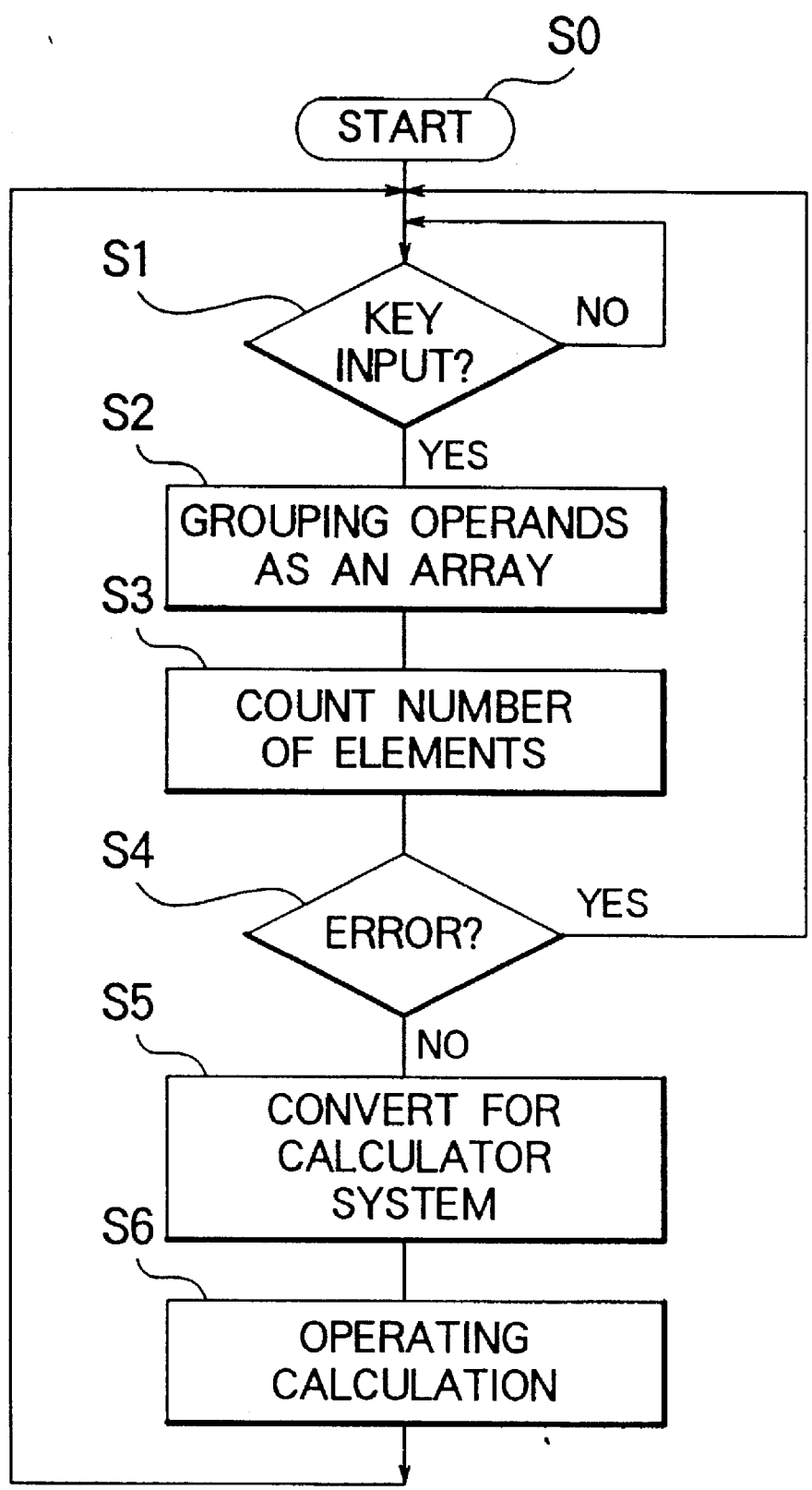
FIG. 3 is a flow chart showing a typical operation of the portable calculator of FIG. 1.

Referring to FIG. 3, there is shown a flow chart of the operation in the portable calculator of FIGS. 1 and 2. When the power switch 18 of the calculator 10 is turned on, the CPU 20 starts the execution of a program stored in the ROM 22 (step S0), then remains in a state For waiting a key input. When a key input operation is detected (step S1), input data are successively stored in the RAM 24. At the same time, the input data are displayed on the LCD 28. When the EXE. key is pressed after an arithmetic expression has been input, the position of each of arithmetic operators and spaces is detected. If a group of digits do not include a space or an arithmetic operator, then they are identified as a single operand. If a space is detected between two of digits, then the two are identified to belong to different operands.

Then, all of pairs of operands, if any, which sandwich a space but do not sandwich an arithmetic operator are detected. Subsequently, a set of successive pairs, in which one operand of one of the detected pairs is common to one operand of the subsequent pair, is formed as a group of operands (step S2). The group of operands is identified as an array including each of the operands as an element thereof in the order of occurrence. Each of the arrays thus identified is stored in one of the memory areas.

With the portable calculator according to the present embodiment, when at least one group constituting an array is identified by an array detecting section, an arithmetic operation defined by an arithmetic operator or arithmetic operators included in the arithmetic expression is carried out for each of the elements included in the array. Accordingly, a plurality of arithmetic operations are executed in response to a single input operation of an arithmetic expression including an array, the number of operations to be executed being equal to the number of elements in the array. As a result, the number of key input operations can be significantly reduced as compared to the conventional portable calculator.

When the array detecting section identifies a plurality of arrays in a single arithmetic expression, an arithmetic operation defined by the arithmetic expression is carried out between each element of one of arrays and corresponding elements of the other array or arrays. In the case where an array exists at one side of an arithmetic operator while single operand exists at the other side of the arithmetic operator, the arithmetic operation is performed between each of the elements included in the array and the single operand in accordance with the arithmetic operator.

If there are a plurality of arrays, the number of elements in each array is counted (step S3) before executing calculation so as to check whether the numbers of elements in all of the arrays are identical to each other (step S4). When the result of the check indicates that there is at least one array which is different from other arrays in the number of elements, an alarm for error is displayed on the LCD 28. In this case, the calculator 10 is brought into a state for waiting for a new key input operation. Alternatively, another configuration of a calculator may be employed in which a portion having an error is highlighted by an alarm on the LCD, and the calculator remains in a state for waiting for correction by an operator.

When it is detected from the result of the error check that the numbers of elements in all of the arrays are the same or there exists only one array in the arithmetic expression and that the arithmetic expression does not include any other error, an arithmetic operation is carried out in accordance with a predetermined procedure.

First, the arithmetic expression including an array or arrays is converted to an arithmetic expression which is suitable for calculation by a known procedure (step S5). For this purpose, a known "Reverse Polish Notation" method may be employed. Subsequently, a first element of each of the arrays is taken out from corresponding one of memory areas. The first elements of the existing arrays are selected as first operands to be processed in accordance with the arithmetic operator in the arithmetic expression. The result of the arithmetic operation is then displayed on the LCD 28. The same arithmetic operation is carried out for the second elements through the last elements consecutively taken out from the memory areas, and the results of the arithmetic operations are displayed on the LCD as an output array (step 6).

Now, operation in the pot table calculator of the embodiment will be described with reference to specific examples of actual calculations.

EXAMPLE 1 it is assumed that an arithmetic expression

"(123_241_328+32)÷24"

is input. First, the operator "+", parentheses and the spaces are identified. As a result, it will be detected that only one array exists in the arithmetic expression, so that the input arithmetic expression is identified as (M+32)÷24. At the same time, it is detected that the number of elements in the array M is 3. In this case, since only one array exists, no error is detected. Accordingly, an arithmetic operation is then performed to each of the elements of the array in accordance with the identified arithmetic expression as follows:

(123+32)÷24;

(241÷32)÷24;

and (328+32)÷24.

Thus, a set of results "6.4583", "11.3750", and "15.0000" are successively displayed as an output array on the LCD.

Example 2

It is assumed that an arithmetic expression

"128_23.4_51.3+24.1_32.2_14"

is input. The arithmetic expression is identified as "M1+M2" wherein each of M1 and M2 represents an array. Since the number of elements in the array M1 and the number of elements in the array M2 are both three, no error detected by the error check. Subsequently, an arithmetic operation defined by the identified arithmetic expression is repeatedly performed for each pair of elements in both the arrays as follows:

128+24.1;

23.4+32.2;

and 51.3+14.

Hence, a set of results "152.1", "55.6", and "65.3" will be successively displayed as an output array on the LCD.

EXAMPLE 3

It is assumed that an arithmetic expression

"128_23.4_51.3+24.1_32.2"

is input. The arithmetic expression is identified as "M1+M2" wherein each of M1 and M2 represents an array. Then, the number of elements in the array M1 and the number of elements in the array M2 are counted. In this case, since the number of elements in the array M1 differs from the number of elements in the array M2, an error is detected so that an alarm is displayed on the LCD. The operator is therefore requested to input a new correct arithmetic expression. Alternatively, another configuration may be employed in which the portable calculator remains in a state for waiting for correction by an operator. In this case, the operator will be able to correct the arithmetic expression with ease, since the arithmetic expression to be corrected is left on the LCD.

EXAMPLE 4

Example 4 is one in which calculation for Table 1 as mentioned before is performed by a "vector calculation" using the calculator of the present embodiment. In this example, an efficient calculation is performed. However, the present invention is not limited to a calculator using the vector calculation method. Table 1 is again shown below.

TABLE 1

|  | APR | MAY | JUN | JLY | AUG | SEP | TOTAL |
|---|---|---|---|---|---|---|---|
| Sales | 140 | 145 | 155 | 162 | 166 |  | 175 |
| Cost price | 100 | 105 | 110 | 125 | 110 |  | 145 |
| Gross profit |  |  |  |  |  |  |  |
| Gross profit rate |  |  |  |  |  |  |  |
| Personnel expenses | 10 | 11 | 12 | 11 | 12 |  | 13 |
| Overhead expenses | 11 | 12 | 13 | 12 | 11 |  | 12 |
| Net profit |  |  |  |  |  |  |  |
| Net profit rate |  |  |  |  |  |  |  |

First, data constituting operands to be calculated are manually stored before calculation in respective memory areas as one-dimensional arrays. The storing operation of the arrays is executed by key input operations for respective rows as follows:

For sales row: "M1←140_145_ ..._175↓"

For cost price row: "M2←100_105_ ..._145↓"

For personnel expenses row: "M3←10_11_ ..._13↓"

For overhead expenses row: "M4←11_12_ ..._12↓".

During these input operations, keys are pressed 36 times including 4 times for variables, 4 times for arithmetic operators, 24 times for operands (the number of key input operations is counted as once for inputting an operand), and 4 times for inputting "↓".

Then, the values for totals in the respective rows are obtained by effecting addition of the elements for each array. Subsequently, further key input operations are performed to combine the elements in each row with the resultant total of each cow so as to obtain a new array for each row. These key operations are as follow:

For sales: "SUM M1↓", "M1←M1, SUM M1 ↓"

For cost price: "SUM M2↓", "M2←M2, SUM M2↓"

For personnel expenses: "SUM M3↓", "M3←M3, SUM M3↓"

For overhead expenses: "SUM M4↓", "M4←M4, SUM M4↓"

During these input operations, keys are pressed 36 times including 16 times for inputting variables, 12 times for arithmetic operators, and 8 times for "↓".

Subsequently, an arithmetic expression is input in which each of the resultant arrays is included to carry out an arithmetic operation for each of blank rows to be filled. The key input operations are as follow:

For gross profit: "M5←M1−M2↓", "M5↓"

For gross profit rate: "M5÷M1×100↓"

For net profit: "M6←M5−M3−M4↓", "M6↓"

For net profit rate: "M6÷M1×100↓".

During these input operations, keys ace pressed 30 times including 13 times for variables, 2 times for operands, 9 times for arithmetic operators, and 6 times for "↓".

With the entire input operations, keys are pressed 102 times in total including 33 times for variables, 26 times for operands, 25 times for arithmetic operators, and 18 times for "↓". Since the conventional calculator requires 202 key input operations in total as described before, the calculator according to the present embodiment can reduce the number of key input operations down to about 50%. The number of key input operations is calculated except for key input operations for spaces, because key input operation for spaces is not laborious or does not cost a significant amount of time as compared to the other symbols. Even if the number of key input operations for spaces are included, the total number of key input operations is 122. Accordingly, the number of key input operations can be significantly reduced.

Table 1 is an example of a calculation table for six months. In the case of a table for twelve months, the number of key input operations can be further reduced. In this case, the conventional calculator requires 382 key input operations in total to complete the table for 12 months, whereas the calculator off the present embodiment requires only 126 key input operations in total, demonstrating that the number of key input operations can be reduced down to about 33%.

In some known programs for personal computers, operands are usually input as elements of an array for tabular calculation. In this case, after each operand has been input to fill a box of an array, an execution key or an arrow key is pressed to store the operand as an element of the array. Subsequently, an arithmetic expression is separately input in which a variable representing each of the elements of the array is included for operands of the arithmetic expression. Accordingly, the operator should have a special knowledge to form an array and to input an arithmetic expression including the array.

In contrast, except for operation in the last example (Example 4), knowledge required to input data in the calculator according to the embodiment is a simple rule, i.e., insertion of a separating symbol between adjacent two of operands. Moreover, an input operation for elements of an array is directly utilized as an input operation for operands in an arithmetic expression. In other words, the input operation of each arithmetic expression is the same as that for conventional calculators, except for the formation of an array with the separating symbol, and a desired arithmetic operation can be performed by a single series of input operation. Further, since the result of key input operations for an arithmetic expression resemble to the arithmetic expression itself, an operator can perform a necessary key operation without special knowledge or special attention.

Although the present invention is described with reference to the preferred embodiment, the present invention is not limited to such embodiment and it will be obvious for those skilled in the art that various modifications or alterations can be easily made based on the above embodiment within the scope of the present invention. For example, the present invention can be applied to a portable function calculator.

What is claimed is:

1. A portable calculator comprising:

an input key group for inputting an arithmetic expression, said input key group including a plurality of first keys each for inputting a decimal digit constituting an operand as combined or alone, a plurality of second keys for inputting an operator and at least one third key for inputting a separating symbol;

a first memory section, operatively connected to said input key group, for storing an arithmetic expression input by said input key group;

an array detecting section, operatively connected to said first memory section, for identifying each operand included in said arithmetic expression as a single operand or one of a plurality of elements of an array comprising a group of operands, each successive two of said plurality of elements of said array sandwiching a separating symbol and sandwiching no operator;

a second memory section, operatively connected to said array detecting section, for storing each array identified by said array detecting section;

an arithmetic executing section, operatively connected to said first memory section and second memory section, for executing an arithmetic operation between corresponding elements of a plurality of arrays or between each of said plurality of elements of each array and each single operand.

2. A portable calculator as defined in claim 1 wherein said array detecting section is implemented by a CPU controlled by a ROM.

3. A portable calculator as defined in claim 1 wherein said separating symbol is a space.

4. A portable calculator as defined in claim 1 wherein said operator is an arithmetic operator.

5. A portable calculator as defined in claim 1 wherein said operator is a functional operator.

6. A portable calculator as defined in claim 1 further comprising an error detecting section counting a number of said plurality of elements each array included in said arithmetic expression.

* * * * *